United States Patent

[11] 3,617,719

| [72] | Inventors | Sung Y. Wong<br>Tarzana;<br>Arthur S. Zukin, Woodland Hills, both of Calif. |
|---|---|---|
| [21] | Appl. No. | 18,585 |
| [22] | Filed | Mar. 11, 1970 |
| [45] | Patented | Nov. 2, 1971 |
| [73] | Assignee | The United States of America as represented by the Secretary of the Air Force |

[54] STAGGERED PROCESSING IN DIGITAL OR HYBRID SIGNAL PROCESSORS
2 Claims, 4 Drawing Figs.

[52] U.S. Cl. .................................................. 235/152, 235/156, 324/77 G, 343/5 DP, 343/17.1 R
[51] Int. Cl. ................................................... G06t 7/38
[50] Field of Search ......................................... 235/152, 156; 324/77 G; 343/5 DP, 17.1 R

[56] References Cited
UNITED STATES PATENTS

| 3,344,407 | 9/1967 | Koeijmans .................. | 343/5 |
| 3,487,405 | 12/1969 | Molho et al .................. | 343/5 X |
| 3,491,360 | 1/1970 | Stoorvogel .................. | 343/17.1 |
| 3,541,348 | 11/1970 | Klund .......................... | 235/152 X |
| 3,544,894 | 12/1970 | Hartwell et al. ............. | 324/77 |

Primary Examiner—Charles E. Atkinson
Attorneys—Harry A. Herbert, Jr. and Julian L. Siegel ABSTRACT: A digital processor of analog in phase and quadrature signals in which the signals are converted to digital form, fed to a sample buffer and then applying the novel means for feeding the signals to a random access memory in staggered sequence. A predetermined number of loops is made with each loop consisting of a vector multiplier, a vector processor, and a return to the memory. Upon completion of the loops, the output is read out from the vector multiplier.

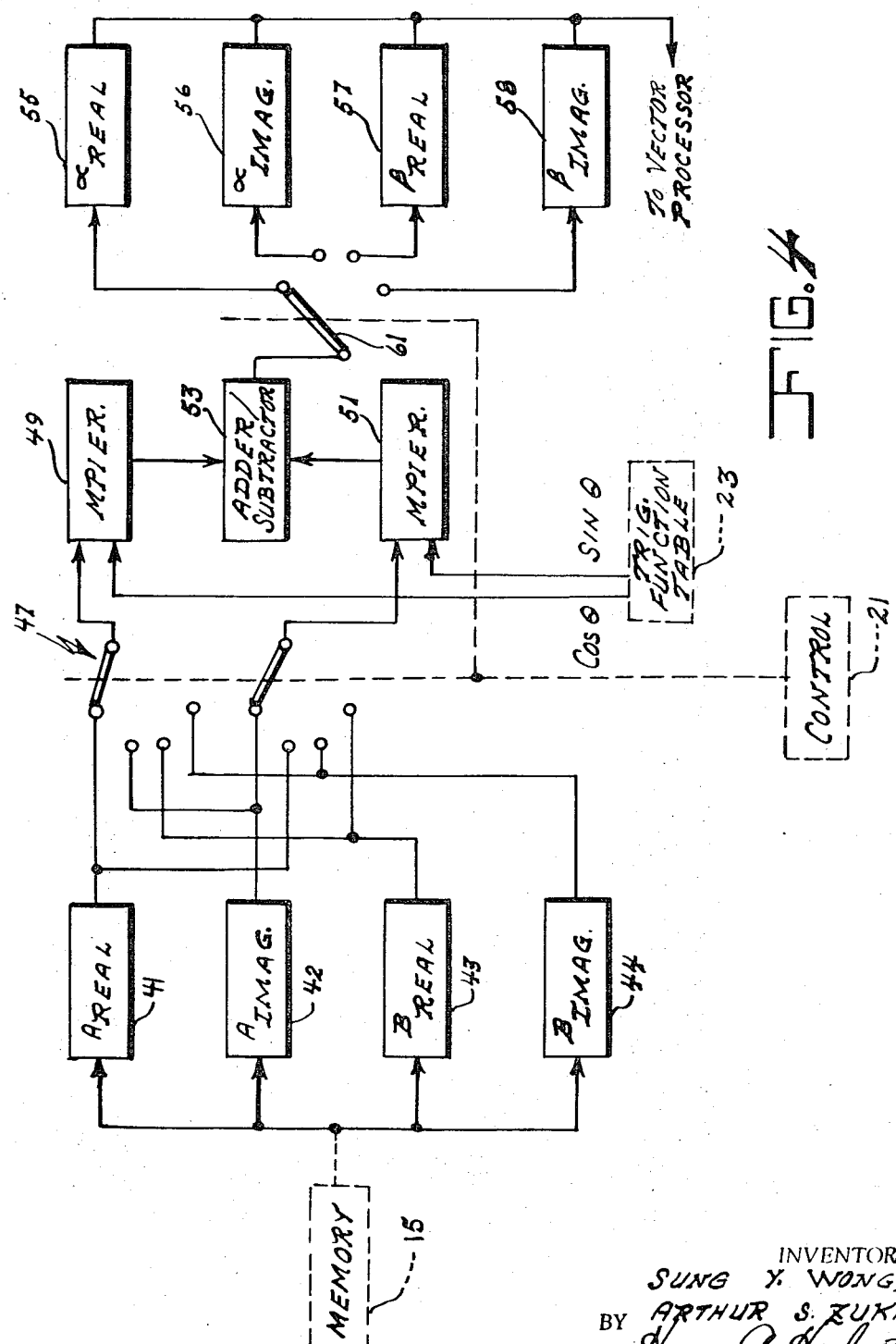

STAGGERED PROCESSING IN DIGITAL OR HYBRID SIGNAL PROCESSORS

BACKGROUND OF THE INVENTION

This invention relates to digital processing and more particularly to a digital system using staggered processing.

For a particular level of functional capability, the most meaningful measure of the worth of a digital processor design is the ability to avail itself with a functional, economical memory. At the present time this means that the memory cycle time would not be less than 20 to 25 percent below 2 microseconds., the number of words in the range would be 2,048 to 8,192, and the number of bits per word would be in the order of 16 to 36. Most memories which fall outside these limits cost about twice as much per bit as a memory in the middle of this range, and memories faster than this require development programs of greater cost, duration, and risk than to increase the speed of the memory by 20 to 25 percent.

Considering the above, an upper bound on the information rate into and (if desired, simultaneously) out of the memory is determined by (maximum bits per word (minimum cycle time) = 36 bits per word/75 percent × 2 $\mu$sec. = 24 bits per microsecond and the maximum size of the single memory may be no greater than (8,192 words) × (36 bits per word) or 295,000 bits. The memory used in the design described here uses 4,096 words of 32 bits with a cycle time of 1.71 microseconds. Thus, it stores 131,000 bits and requires an information rate of less than 19 bits per microsecond.

Because the data for an entire 7 or 14 milliseconds frame is processed as a "set," the absolute minimum amount of memory is that required to store the 4,096 samples obtained during the longest (14 msec.) frame. If only this much storage is provided, processing must be performed instantaneously at the end of a data gathering period and the filtered results transferred to the using equipment instantaneously; these conditions are obviously impossible to meet. A reasonable upper limit is the amount of storage required for two frames of data or 2×4,096=8,192 samples. This would result in a system in which data processing takes one frame time and occurs during the next frame after the data is gathered, and the processed data is unloaded during the second frame after its samples were loaded into the memory simultaneously with the loading of new data.

A scheme called staggered processing is disclosed in which the start of the frame times for the two sub-bands A and B is staggered by 7 milliseconds (i.e., one-half of a 14 milliseconds frame) and the information for the individual sub-band frame was processed during a period of 7 milliseconds.

SUMMARY OF THE INVENTION

The present invention is an improved digital processor which has utility in a radar system.

The processor acts like an analog filter in which the input from the radar sample and hole circuits are fed to an analog digital converter. The input signals are fed in as pairs of in phase and quadrature signals. The output of the processor represents the square of the filter's magnitude or amplitude which can then be fed to the radar ranger unit. The digital output of the analog digital converter is then fed to a sample buffer and then to a random access memory unit in a staggered sequence. The data hence is processed in a scattered sequence in a loop consisting of a vector multiplier, a vector processor, and a return to memory. The vector multiplier multiplies the real and imaginary components with the appropriate trigonometric, functions from a table and then adds or subtracts the results. The data passes through the loop three times, then to the multiplier once again where the multiplier computes the square of the magnitudes of the complex signals.

It is therefore an object of this invention to provide a novel digital processor.

It is another object to provide a digital processor that acts as an analog for a radar system.

It is still another object to provide an additional processor which conserves memory space by using a staggered system of processing.

These and other advantages, features and objects of the invention will become more apparent from the following description taken in connection with the illustrative embodiment in the accompanying drawings, wherein:

DESCRIPTION OF THE DRAWINGS

FIG. 2 is a block diagram showing the order of customary processing;

FIG. 3 is a diagram showing the system of staggered processing; and

FIG. 4 is a block diagram showing the vector multiplier.

DESCRIPTION OF THE PREFERRED EMBODIMENT

Figure 1:
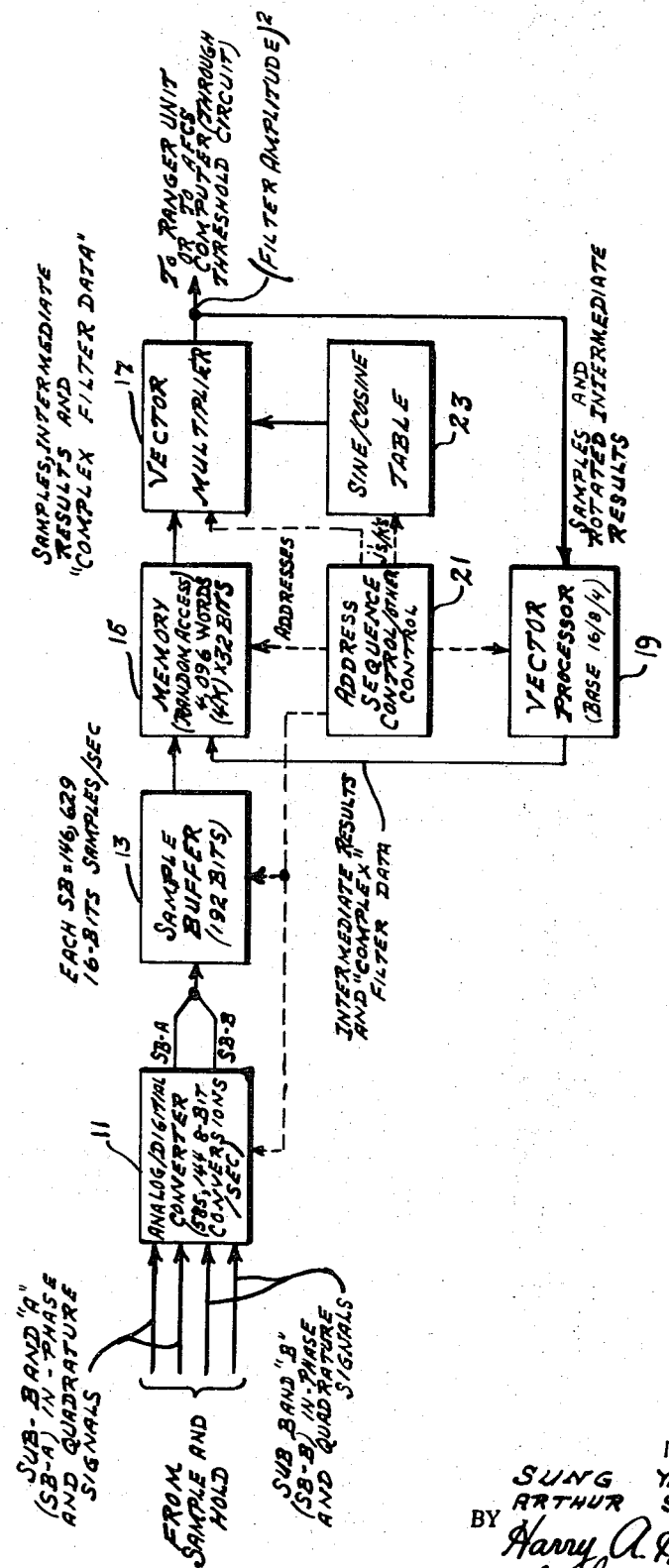
FIG. 1 is a block diagram of a digital processor.

A digital processor is shown in block diagram form in FIG. 1 in which the data flow is designated to provide a sample sequence in which information is cycled between the memory and the vector processor until the input complex samples are converted to output complex quantities representing the real and imaginary portions of the signal voltage which has passed through an equivalent analog filter. Input data flows from the sample and hold circuits of the radar into analog to digital converter 11 and then to sample buffer 13 and from there to memory 15. As the data is processed it flows from memory 15 through vector multiplier 17 and vector processor 19 and then back to memory 15. The loop occurs three times with the information returned to memory 15 after the third loop and this represents the filter magnitudes which are read out of memory 15 through vector multiplier 17 where they are converted into the square of the magnitude and become the output of the digital processor.

In phase and quadrature signals from the sample and hold circuits for each of the two sub-bands, which are designated SB-A and SB-B, are digitized in analog digital converter 11 to provide 8-bit (7 bits plus sign) conversion of the in phase and the quadrature signals. A total of 585,144 8-bit conversions occur each second; each set of four 8-bit conversions represents the in phase and quadrature components resulting from the essentially simultaneous conversion of the signals of the two sub-bands and each set results in one 32-bit word comprised of two 16-bit halves, each composed of two 8-bit portions representing the in phase and quadrature components. Thus, the average rate into the memory is one-quarter of 585,144 or 146,286 words per second.

Five or six input words are collected in the sample buffer 13 and a burst of five or six successive memory cycles are read into the memory 15 at the same time that an equal number of filters are read out of the memory. The procedure is an exchange of data in which the data flowing into the memory 15 replaces in the same memory location the data flowing out of the memory at a rate of one word per 1.71 microseconds memory cycle. The data leaving the memory represents the complex filter output voltage and is multiplied by its complex conjugate in the vector multiplier to form the square of the magnitude.

When the processor is first turned on, no useful processing can occur until one complete frame of data has entered the memory. Subsequently groups of 16 operands per sub-band are read out of the M-word memory from locations (0, M/16, 2M/16, 3M/16, . . . ), (1, M/16+1, 2M/16+1, 3M/16+, . . .), 2, M/16+2, 2M/16+2, 3M/16+2, . . .), and so on. Henceforth, each of the sub-bands containing 16 operands will be referred to as a G-16. Each of the 16 words in a G-16 contains 16 bits of subband A data and 16 bits of sub-band 13 data. of the sub-bands containing 16 operands will be referred to as a G-16. Each of the 16 words in a G-16 contains 16 bits of sub-band A data and 16 bits of sub-band 13 data.

The reading of 16 words occurs in a burst of 16 memory cycles while five or six words are collected in the input buffer. Between successive bursts of reading data out of the memory, a burst of five or six memory cycles is employed to load five or six new data words.

A G-16, like all data leaving the memory passes through the vector multiplier 17 word by word but in this, the first step, is passed through vector multiplier 17 without change and on into vector processor 19. In vector processor 19, the G-16 data for each of the sub-bands is subjected to a base 16 fast Fourier transform procedure. The time allowed for this is five or six memory cycles. At the end of the base 16 procedure, the 16 pairs of results in the 16 words of the G-16 are returned word by word to memory 15 in a burst of 16 memory cycles to replace the 16 words of the next G-16 as they are read out of memory 15 through vector multiplier 17 to vector processor 19, etc.

Ideally, the processed G-16 would be returned to locations in memory 15 from which the same input G-16 had been obtained. This would require one memory cycle to read the data plus another memory cycle to write, resulting in a total of two memory cycles per word. However, the information exchange can be performed during a single memory cycle per word. The effectively double memory speed is not obtained without penalty and forces the use of an address sequence control 21 to keep track of the changing memory addresses. After the last G-16 has been passed through vector processor 19, it is returned to the location from which the first G-16 was obtained and one of the three fast Fourier steps has been completed.

During the next fast Fourier step, the procedure is similar with alternate bursts of five or six memory cycles employed to read in new data and 16 memory cycle bursts employed to exchange memory data destined for vector processor 19 with processed data therefrom. There are, however, two important differences from the first step. These are:

1. In order to perform the required phase rotation, complex operands leaving the memory are multiplied by the appropriate unit vectors within the vector multiplier 17 before entering the vector processor 19. For a rotation of $\theta$ radians, the unit vector $\cos\theta + i\sin\theta$, is generated by the sine/cosine table which is provided with the rotation angle by the address sequence control. Trigonometric functions of angles from zero to $\pi/4$ to $2\pi$ are derived from the directly generated functions which is a conventional procedure.

2. Operands are taken in groups of eight (G-8) for the second step of a 14 millisecond, 4,096 sample frame, and in groups of four (G-4) for the second step of a 7 milliseconds, 2,048 sample frame. However, the transfers between memory 15 and vector processor 19 still occur in bursts of 16 memory cycles. The 16 words involved represent two G-8's or four G-4's.

During the last of the three fast Fourier steps, processing again utilizes G-16's. However, the last step differs from the first in that the complex data is multiplied by the appropriate unit vectors in the vector multiplier. The multiplication and sine/cosine procedures are identical to those employed in the second step.

The data returned to the memory during the third or last step represents the complex magnitudes of the filtered input signals and enters the memory during the last one-third of the frame after that in which it was obtained. During the next frame, as new data enters the memory in bursts of five or six memory cycles, an equal quantity of filters are read out of the memory. Like all information leaving the memory, the filters pass through vector multiplier 17. Within vector multiplier 17 each complex filter is multiplied by its own complex conjugate to provide the square of its magnitude according to the well-known relationship:

Magnitude $^2 = f(a+jb) = a^2+b^2 = (a+jb)(a-jb)$.

The squared magnitudes provide the digital processor output signals to the threshold circuits.

Figures 2, 3:
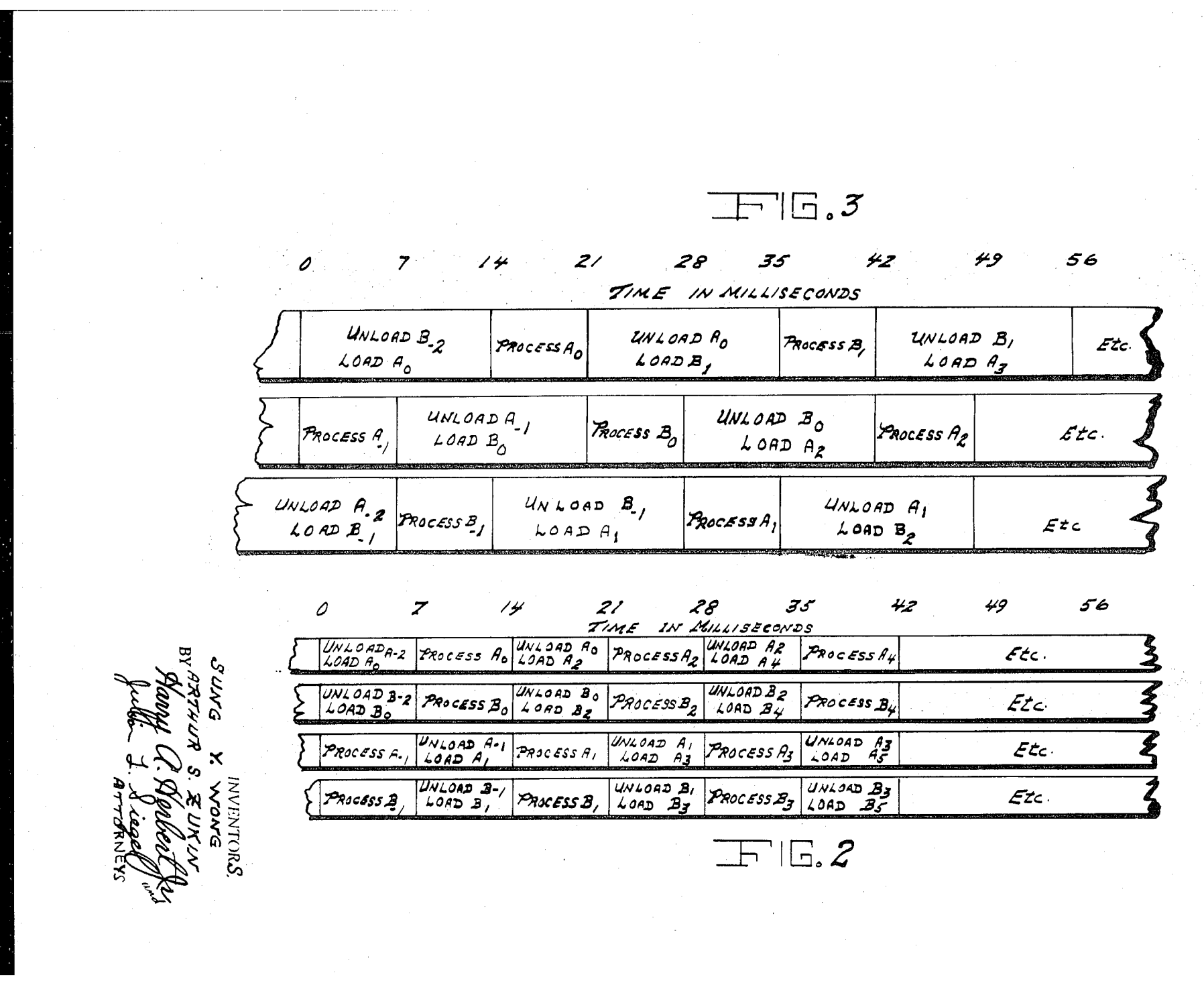

A scheme described as staggered processing is used in which the start of the frame time for the two sub-bands A and B is staggered by 7 milliseconds which is one-half of the 14 milliseconds frame, and the information for the individual sub-band frame is processed during a period of 7 milliseconds. Normally the processing is done as shown in FIG. 2 where the subscripts represent successive frames. In the first 14 milliseconds in one groups, sub-band $A_2$ is unloaded and $A_0$ is processed after which $A_0$ is unloaded and $A_2$ is loaded, which then follows the processing of $A_3$. Each of the above operations is performed in 14 milliseconds frames and repeated. The same scheme is then followed with the other sub-bands as shown. The order and timing of the inputs and outputs including the sine/cosine table 23 is controlled by address sequence control 21 which is conventional in the art. Its function is to determine the location of addresses from random access memories to which data is read and in which data is written and to provide the sine/cosine table with the measure of the rotation angles to be used to rotate vectors leading to memories for input into the vector processing.

In a staggered processing system such as shown in FIG. 3, the start of the frame time for the two sub-bands is staggered in this case by 7 milliseconds, which is one-half of the 14 milliseconds frame, and the information is processed during the 7 milliseconds period.

The vector multiplier is shown in FIG. 4 in which memory 15 feeds the real and imaginary registers 41 and 44 of the multiplier. Ganged switch 47 makes the appropriate connection in a manner to first connect the real component of A to multiplier 49 and the imaginary component of A to multiplier 51. Also fed to the multiplier is the output of trigonometric table 23. In the second position the inputs to multipliers 49 and 51 are reversed. The same connecting arrangement is repeated for the real and imaginary components of B. The outputs of multipliers 49 and 51 are fed to the adder-subtractor 53 and then transferred to registers 55–58 through switch 61. In the filter mode the trigonometric table is disconnected.

We claim:

1. In an analog filter type digital processor of pairs of complex signals from a radar for producing the square of the magnitude of the complex signals comprising an analog to digital converter fed by a pair of sub-bands, each sub-band including an in phase and quadrature signal, a sample buffer circuit fed by the analog to digital converter, a memory fed by the buffer circuit, means for vector multiplication and rotation fed by the memory, a vector processor fed by the multiplication and rotation means with the output being fed to the memory, wherein the improvement comprises:
   a. means for controlling the address sequence, the number of loops, and the order of processing, the controlling means connected to the analog to digital converter, the sample buffer, the memory, and the vector multiplier; and
   b. means within the control means for staggering the input sequence of sub-bands into the memory.

2. A digital processor according to claim 1 wherein the vector multiplication and rotation means comprises:
   a. a plurality of registers for the real and imaginary components of the complex signals, the registers being fed by the memory;
   b. a pair of vector multipliers;
   c. means for selectively connecting the plurality of registers to the pair of vector multipliers;
   d. means for feeding trigonometric values to the pair of vector multipliers;
   e. an arithmetic unit for adding and subtracting fed by the pair of multipliers; and
   f. means for retrieving the output from the arithmetic unit.

* * * * *